United States Patent
Shimamoto et al.

(10) Patent No.: US 8,561,883 B2
(45) Date of Patent: Oct. 22, 2013

(54) IMAGE PROCESSING APPARATUS

(75) Inventors: Kunihiko Shimamoto, Osaka (JP); Yuya Tagami, Osaka (JP)

(73) Assignee: Kyocera Document Solutions Inc. (JP)

( * ) Notice: Subject to any disclaimer, the term of this patent is extended or adjusted under 35 U.S.C. 154(b) by 0 days.

(21) Appl. No.: 13/451,971

(22) Filed: Apr. 20, 2012

(65) Prior Publication Data

US 2012/0273563 A1 Nov. 1, 2012

(30) Foreign Application Priority Data

Apr. 27, 2011 (JP) ................................. 2011-098980

(51) Int. Cl.
*G06F 17/00* (2006.01)
(52) U.S. Cl.
USPC ................. 235/375; 235/462.09; 235/462.1
(58) Field of Classification Search
USPC ................. 235/375, 462.01, 462.09, 462.1
See application file for complete search history.

(56) References Cited

U.S. PATENT DOCUMENTS

| 2003/0016844 A1* | 1/2003 | Numaoka ...................... 382/100 |
| 2007/0114285 A1* | 5/2007 | Chang et al. ............... 235/462.1 |
| 2009/0034787 A1  | 2/2009 | Sato |
| 2010/0327066 A1* | 12/2010 | Khan ........................ 235/462.01 |
| 2011/0290879 A1* | 12/2011 | Guo et al. ..................... 235/437 |

FOREIGN PATENT DOCUMENTS

| JP | 2009-55582 | 3/2009 |
| JP | 2011-014012 | 1/2011 |

* cited by examiner

*Primary Examiner* — Edwyn Labaze
(74) *Attorney, Agent, or Firm* — Stephen Chin

(57) ABSTRACT

An image processing apparatus of the present disclosure includes: (a) a two-dimensional matrix barcode detecting unit configured to detect a two-dimensional matrix barcode if an image of image data includes the two-dimensional matrix barcode; and (b) a broken matrix barcode detecting unit configured to determine whether a broken two-dimensional matrix barcode exists in the image or not when the two-dimensional matrix barcode detecting unit does not detect the two-dimensional matrix barcode but detects at least one position detection pattern. The broken matrix barcode detecting unit determines whether the broken two-dimensional matrix barcode exists in the image or not on the basis of a pattern in a predetermined position adjacent to the detected position detection pattern.

5 Claims, 8 Drawing Sheets

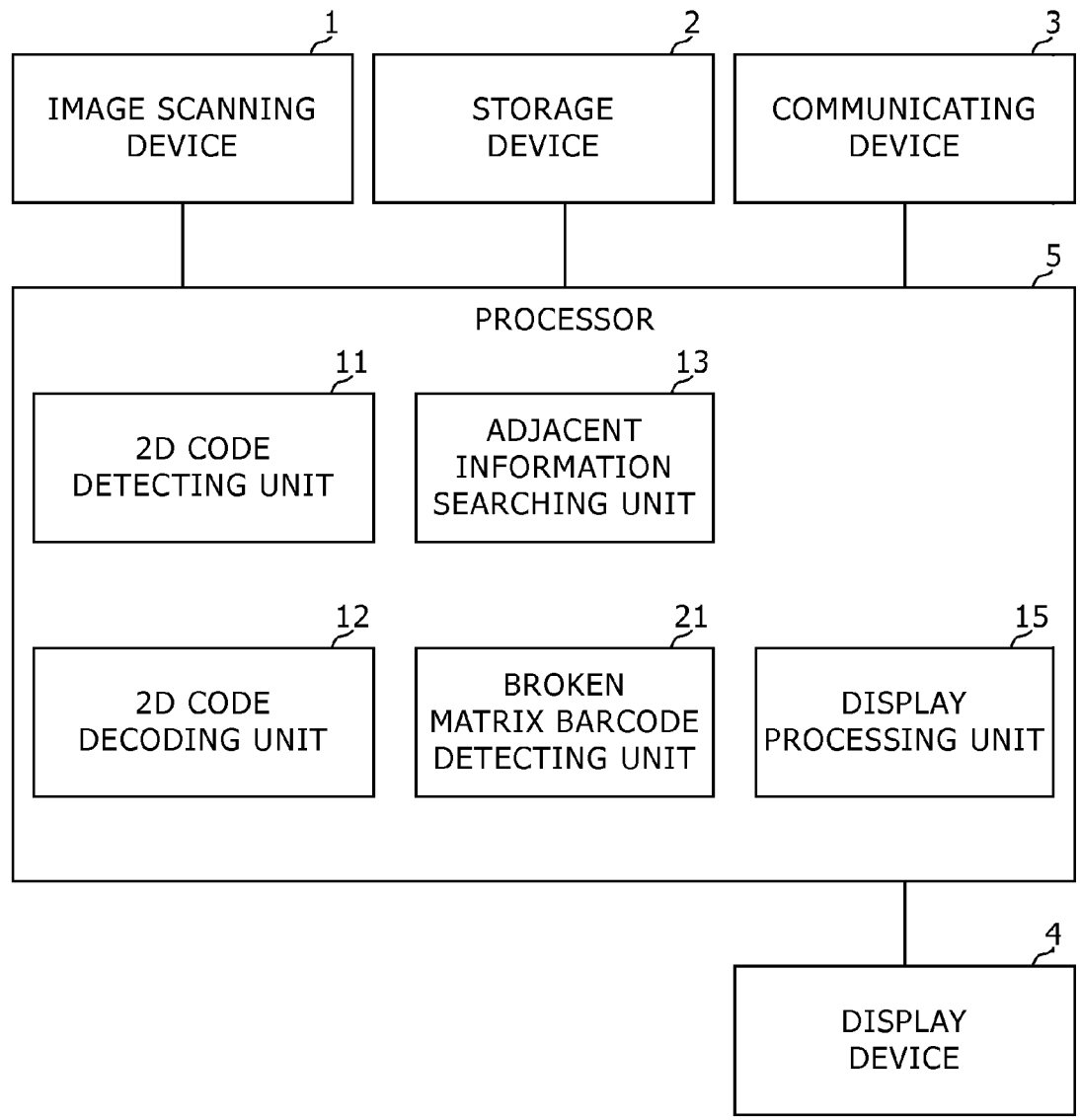

IMAGE PROCESSING APPARATUS

CROSS-REFERENCE TO RELATED APPLICATION

This application relates to and claims priority rights from a Japanese Patent Application: No. 2011-098980, filed on Apr. 27, 2011, the entire disclosures of which are hereby incorporated by reference herein.

BACKGROUND OF THE INVENTION

1. Field of the Invention

The present invention relates to image processing apparatuses.

2. Description of the Related Art

Recently, two-dimensional matrix barcodes are widely used, such as QR code (trademark). Hereinafter, "two-dimensional matrix barcode" is simply described as "2D code." A technique is proposed that if an error detection rate is equal to or greater than a predetermined value due to a broken part of a 2D code when the 2D code is read, then a new 2D code is generated on the basis of information obtained by decoding the 2D code, and the original partially-broken 2D code is replaced with the new 2D code.

Some 2D codes broken with a stain or a chip cannot be detected. For example, if a position detection pattern is broken in the 2D code, then the 2D code is not detected, even though it exists. When the 2D code is not detected even though it exists, some troubles may arise.

For example, as shown in FIG. 8, in a certain situation, information on addresses of documents is encoded to 2D codes which have been printed on the documents, and images of the documents are automatically transmitted to the respective addresses obtained by decoding the 2D codes in the images scanned from the documents. As shown in FIG. 8, when images of three consecutive sheets as three documents want to be transmitted to respective different three addresses, if a 2D code on the second sheet is broken, then the second sheet is determined as the second sheet of the first document in error rather than the second document, and consequently the image of the second sheet is transmitted to the address of the first document in error.

SUMMARY OF THE INVENTION

An image processing apparatus according to an aspect of the present disclosure includes: (a) a two-dimensional matrix barcode detecting unit is configured to detect a two-dimensional matrix barcode if an image of image data includes the two-dimensional matrix barcode; and (b) a broken matrix barcode detecting unit configured to determine whether a broken two-dimensional matrix barcode exists in the image or not when the two-dimensional matrix barcode detecting unit does not detect the two-dimensional matrix barcode but detects at least one position detection pattern. The broken matrix barcode detecting unit is further configured to determine whether a broken two-dimensional matrix barcode exists in the image or not on the basis of a pattern in a predetermined position adjacent to the detected position detection pattern.

Therefore, it enables to detect existence of a broken 2D code which is not detected as a 2D code, and to lessen troubles involved due to breakage of a 2D code.

These and other objects, features and advantages of the present invention will become more apparent upon reading of the following detailed description along with the accompanied drawings.

BRIEF DESCRIPTION OF THE DRAWINGS

FIG. 5 shows a block diagram which indicates a configuration of an image processing apparatus according to Embodiment 2 of the present disclosure;

DETAILED DESCRIPTION

Hereinafter, embodiments according to aspects of the present disclosure will be explained with reference to drawings.

Embodiment 1

Figure 1:
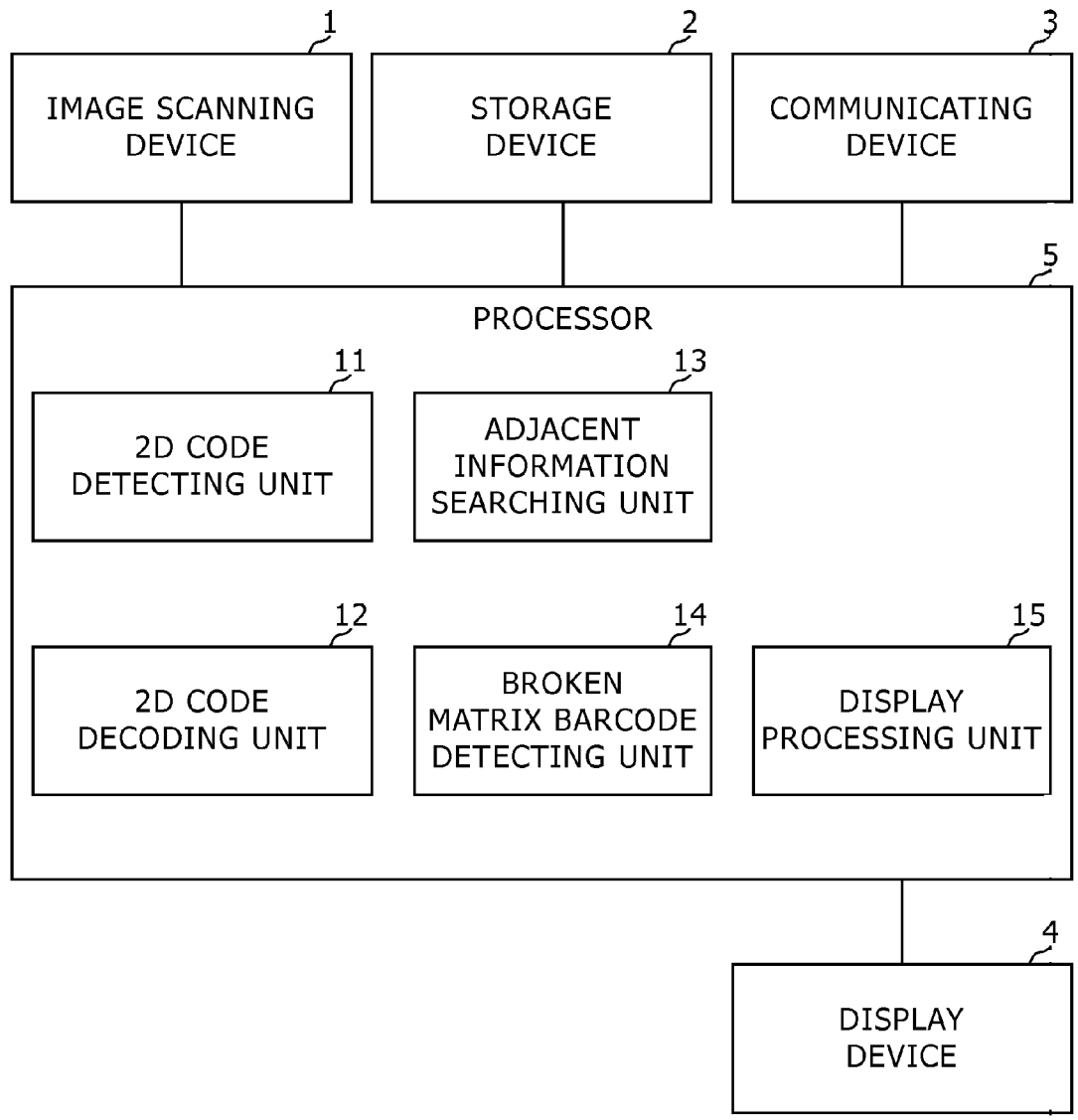
FIG. 1 shows a block diagram which indicates a configuration of an image processing apparatus according to Embodiment 1 of the present disclosure.

FIG. 1 shows a block diagram which indicates a configuration of an image processing apparatus according to Embodiment 1 of the present disclosure. This image processing apparatus includes an image scanning device 1, a storage device 2, a communicating device 3, a display device 4, and a processor 5.

The image scanning device 1 is an internal device which optically scans a document image from a document, and generates image data of the document image.

The storage device 2 is a device capable of storing data and programs. A non-volatile storage medium with a large capacity is used as the storage device 2, such as non-volatile memory or hard disk drive. The storage device 2 is capable of storing the document data.

The communicating device 3 is a device which performs data communication with an external device. A network interface which performs network communication or a modem which performs facsimile communication is used as the communicating device 3.

The display device 4 displays information to a user. For example, a liquid crystal display is used as the display device 4.

The processor 5 is a computer which includes a CPU (Central Processing Unit), a ROM (Read Only Memory), and a RAM (Random Access Memory), loads a program from the ROM or the storage device 2 to the RAM, and executes the program with the CPU to form various processing units. In this embodiment, in the processor 5, are formed a 2D code detecting unit 11, a 2D code decoding unit 12, an adjacent information searching unit 13, a broken matrix barcode detecting unit 14, a display processing unit 15, and so forth.

The 2D code detecting unit 11 detects a 2D code if an image of image data includes the 2D code. In this embodiment, a QR code (trademark) is used as the 2D code. The 2D code detecting unit 11 searches for position detection patterns in the image of the image data. If the 2D code detecting unit 11 finds all position detection patterns required for decoding a 2D code (for example, for QR code (trademark), three position detection patterns are required), the 2D code detecting unit 11 determines that the 2D code is detected in the image.

The 2D code decoding unit 12 extracts original information by decoding a 2D code, if the 2D code is detected by the 2D code detecting unit 11.

The adjacent information searching unit 13 searches for version information and/or format information in a predetermined position adjacent to a detected position detection pattern (mentioned below). Since a QR code (trademark) includes the version information and the format information at given positions, images at the given positions are searched for them.

The broken matrix barcode detecting unit 14 determines whether a 2D code (i.e. broken one) exists in the image or not when the 2D code detecting unit 11 does not detect the 2D code but detects at least one position detection pattern. The broken matrix barcode detecting unit 14 determines whether a broken 2D code exists in the image or not on the basis of a pattern in a predetermined position adjacent to the detected position detection pattern.

In Embodiment 1, if the adjacent information searching unit 13 finds the version information and/or the format information, then the broken matrix barcode detecting unit 14 determines that a broken 2D code exists in the image.

The display processing unit 15 causes the display device 4 to display an error message (for example, "This 2D code is broken."), if the broken matrix barcode detecting unit 14 determines that a broken 2D code exists in the image.

Figure 2:
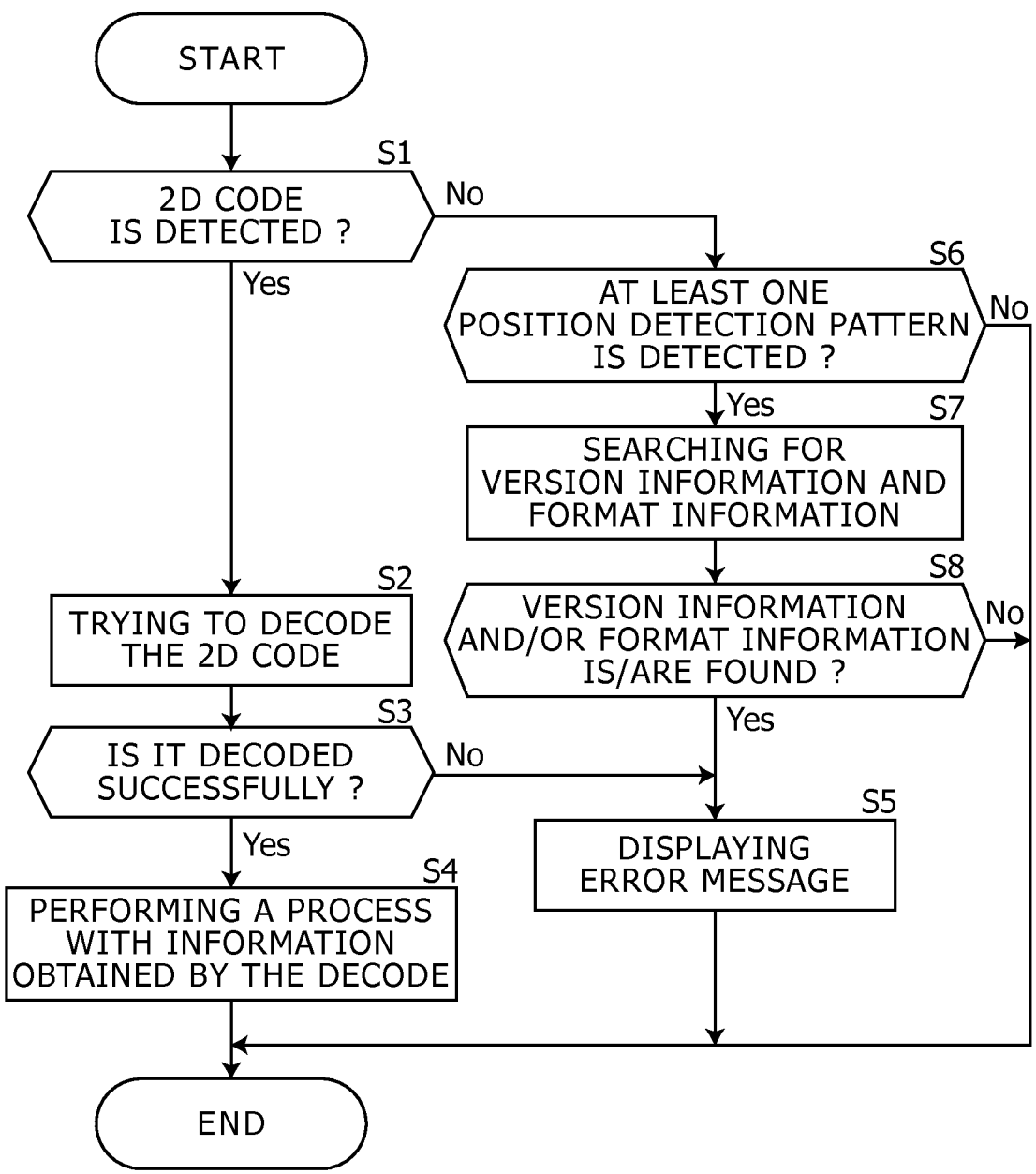
FIG. 2 shows a flowchart which explains a behavior of the image processing apparatus according to Embodiment 1.
Figure 3:
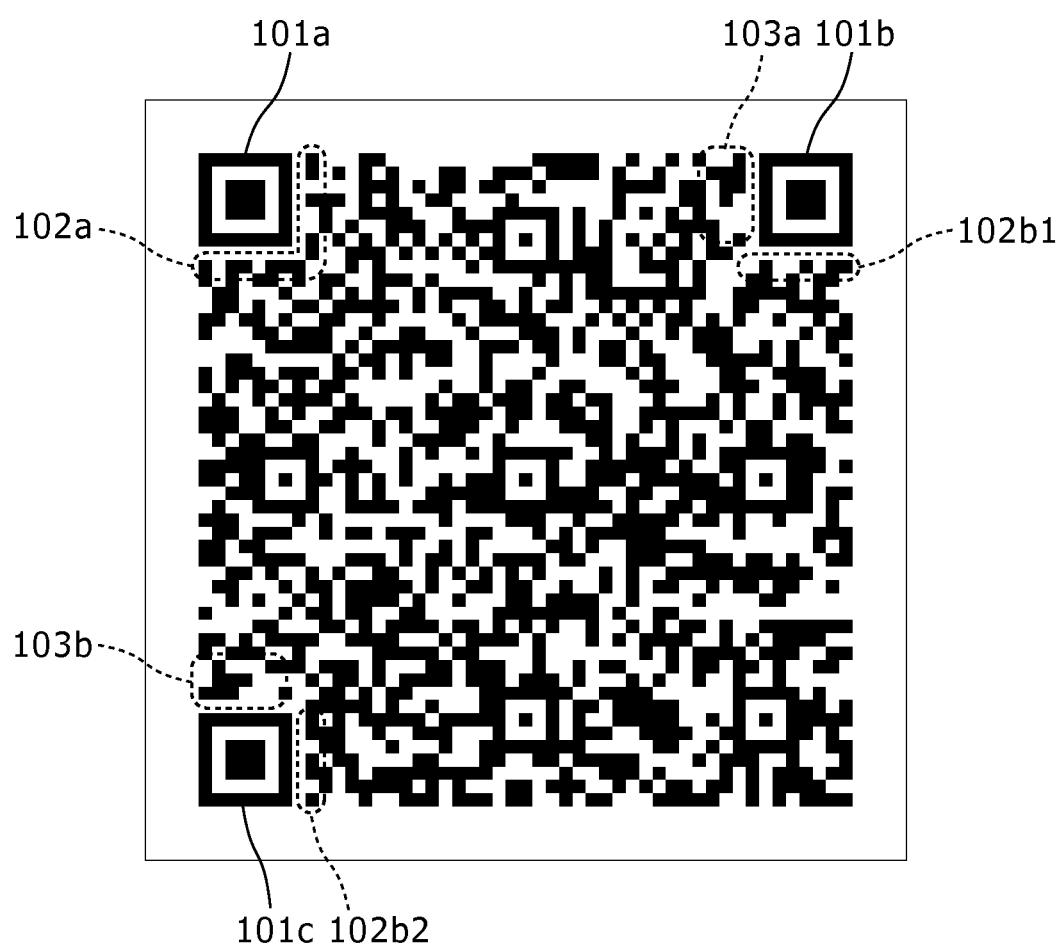
FIG. 3 shows a diagram which explains a configuration of a QR code (trademark)

In the following part, a behavior of the image processing apparatus in Embodiment 1 is explained. FIG. 2 shows a flowchart which explains a behavior of the image processing apparatus according to Embodiment 1. Hereinafter, a QR code (trademark) is used as a 2D code to be processed. FIG. 3 shows a diagram which explains a configuration of a QR code (trademark).

This image processing apparatus processes image data provided from the image scanning device 1, image data in the storage device 2, image data received by the communicating device 3, and so forth.

The 2D code detecting unit 11 tries to detect a 2D code in an image of image data to be processed (Step S1). Specifically, the 2D code detecting unit 11 tries to detect three position detection patterns 101a, 101b, and 101c, and determines that a 2D code exists in the image, if the three position detection patterns 101a, 101b, and 101c are detected. Thus, in this case, the 2D code is detected. Contrary to this, if the 2D code detecting unit 11 does not detect any of the three position detection patterns 101a, 101b, and 101c, then it is determined that a 2D code (i.e. valid, unbroken 2D code) does not exist in the image. Thus, in this case, the 2D code is not detected.

If the 2D code is detected, the 2D code decoding unit tries to decode a 2D code on the basis of position information on the three position detection patterns 101a, 101b, and 101c obtained by the 2D code detecting unit 11 (Step S2).

If the 2D code decoding unit 12 decodes the 2D code successfully (Step S3), then a predetermined process is performed on the basis of information obtained by decoding the 2D code (Step S4). If the 2D code decoding unit 12 fails to decode the 2D code (Step S3), then the display processing unit 15 causes the display device 4 to display an error message (Step S5).

As mentioned, if the 2D code is detected, then the 2D code is decoded.

Otherwise, the 2D code is not detected, but a broken 2D code may exist. In a case that any 2D codes are not detected (Step S1), if at least one position detection pattern is detected (Step S6), then the adjacent information searching unit 13 searches for version information and format information which should exist in predetermined positions adjacent to the detected position detection pattern (Step S7).

As shown in FIG. 3, in a case of QR code (trademark), an area 102a adjacent to the position detection pattern 101a includes a piece of the format information; and an area 102b1 adjacent to the position detection pattern 101b and an area 102b2 adjacent to the position detection pattern 101c include a piece of the format information. Further, an area 103a adjacent to the position detection pattern 101b includes a piece of the version information, and an area 103b adjacent to the position detection pattern 101c includes a piece of the version information. Therefore, assuming that the detected position detection pattern is any of the position detection patterns 101a, 101b, and 101c in a QR code (trademark), the adjacent information searching unit tries to extract version information and format information from areas regarded as the area 102a, the areas 102b1, 103a and the areas 102b2, 103b. Since values of the version information and the format information are given, it is possible to determine whether the extracted information is valid version information and format information.

Figure 4A:
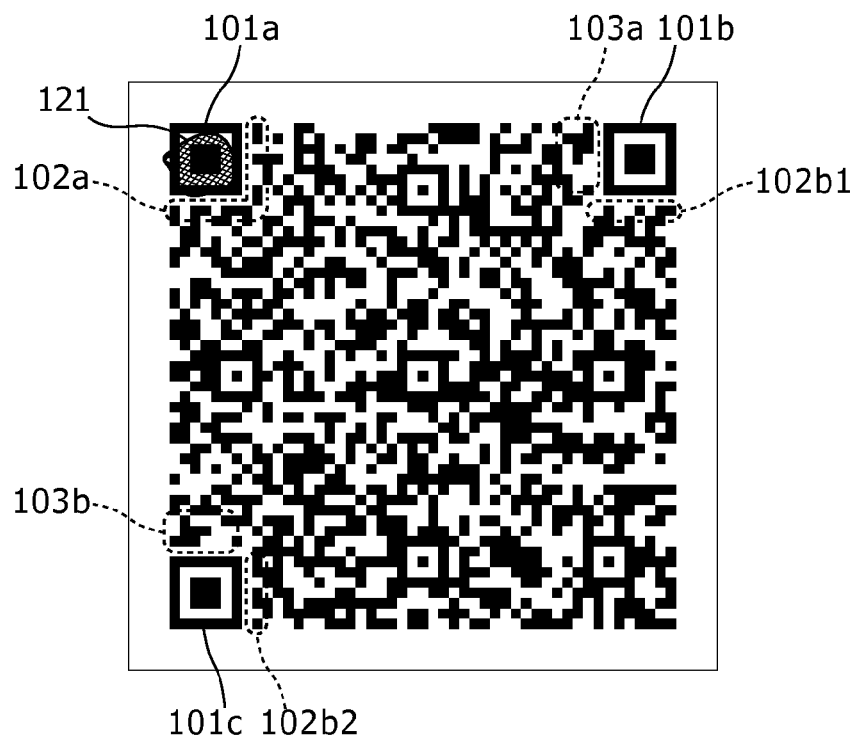
FIGS. 4A and 4B show diagrams which indicate examples of a broken QR code (trademark)
Figure 4B:
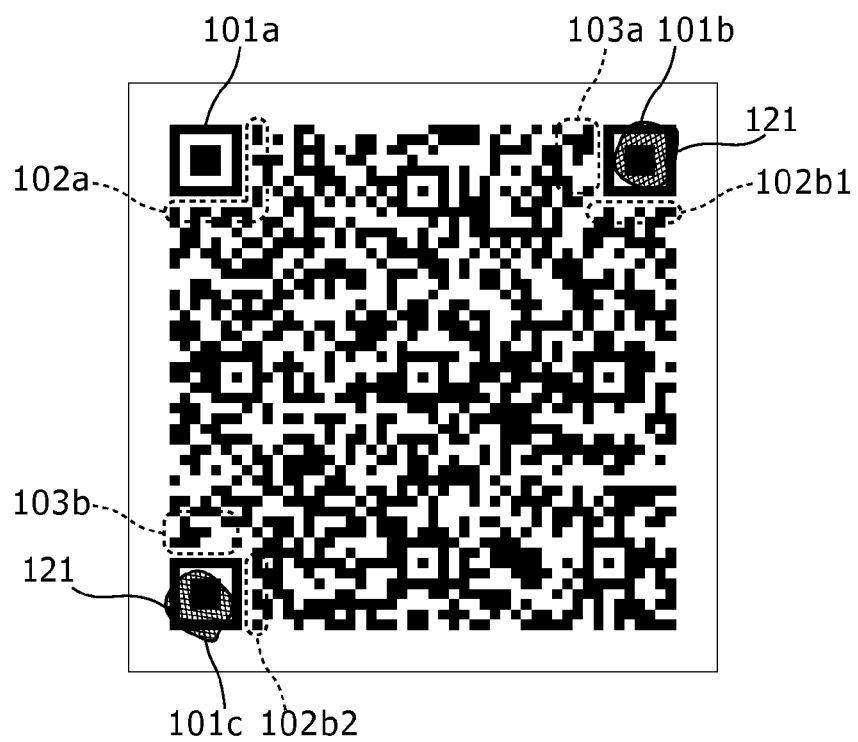

FIGS. 4A and 4B show diagrams which indicate examples of a broken QR code (trademark). FIG. 4A shows a case that a stain 121 covers the position detection pattern 101a. FIG. 4B shows a case that stains 121 cover the position detection patterns 101b and 101c. In the case shown in FIG. 4A, the position detection pattern 101a is not detected, and therefore, this QR code (trademark) is not detected by the 2D code detecting unit 11. Similarly, in the case shown in FIG. 4B, the position detection patterns 101b and 101c are not detected, and therefore, this QR code (trademark) is not detected by the 2D code detecting unit 11.

If the adjacent information searching unit 13 finds the valid version information and/or the valid format information (Step S8), then the broken matrix barcode detecting unit 14 determines that a broken 2D code exists in the image of the image data, and the display processing unit causes the display unit 4 to display an error message (Step S5).

For example, in the case shown in FIG. 4A, the position detection patterns 101b and 101c are detected, and the version information and the format information is detected in the area 102b1, 102b2 and the area 103a, 103b; and consequently, it is determined that a broken 2D code exists in the image, and the error message is displayed. For example, in the case shown in FIG. 4B, the position detection pattern 101a is detected, and the version information is detected in the area 102a; and consequently, it is determined that a broken 2D code exists in the image, and the error message is displayed.

Contrary to these, if any of the position detection patterns is not detected (Step S6) or if the 2D code detecting unit 11 does not detect any of the valid version information and the valid format information (Step S8), then the broken matrix barcode detecting unit 14 determines that any 2D codes (including a broken one) do not exist in the image.

In the aforementioned Embodiment 1, the broken matrix barcode detecting unit 14 determines whether a broken 2D code exists in the image or not when the 2D code detecting unit 11 does not detect a 2D code but detects at least one position detection pattern. The broken matrix barcode detecting unit 14 determines whether a broken 2D code exists in the image or not on the basis of a pattern in a predetermined position adjacent to the detected position detection pattern. Specifically, in Embodiment 1, if the adjacent information searching unit 13 finds the version information and/or the format information, then the broken matrix barcode detecting unit 14 determines that a broken 2D code exists in the image.

Therefore, it is possible to detect existence of a broken 2D code which is not detected as a 2D code, and to lessen troubles involved due to breakage of a 2D code.

Embodiment 2

FIG. 5 shows a block diagram which indicates a configuration of an image processing apparatus according to Embodiment 2 of the present disclosure. In Embodiment 2, in the processor 5, a broken matrix barcode detecting unit 21 is formed instead of the broken matrix barcode detecting unit 14 of Embodiment 1.

In Embodiment 2, if only one of the position detection patterns is detected and the version information is detected by the adjacent information searching unit 13, then the broken matrix barcode detecting unit 21 (a) estimates positions of remaining position detection patterns on the basis of the version information, (b) causes the 2D code decoding unit 12 to try to decode a 2D code on the basis of the positions of both the detected position detection pattern and the remaining position detection patterns, and (c) determines that a broken 2D code exists in the image if the decode succeeds to a predetermined stage (for example, finishing obtaining the version information and the format information).

Specifically, the broken matrix barcode detecting unit estimates the positions of the remaining position detection patterns on the basis of: (a) a cell size measured in the 2D code and (b) the number of cells specified in the detected version information.

Further, if only two of the position detection patterns are detected, then the broken matrix barcode detecting unit 21 (a) estimates a position of the remaining position detection pattern on the basis of positions of the detected position detection patterns, (b) causes the 2D code decoding unit 12 to try to decode a 2D code on the basis of the positions of both the detected position detection patterns and the remaining position detection pattern, and (c) determines that a broken 2D code exists in the image if the decode succeeds to a predetermined stage.

Other parts of configuration of the image processing apparatus in Embodiment 2 are identical to those in Embodiment 1 (in FIG. 1), and therefore, they are not explained here.

Figure 6:
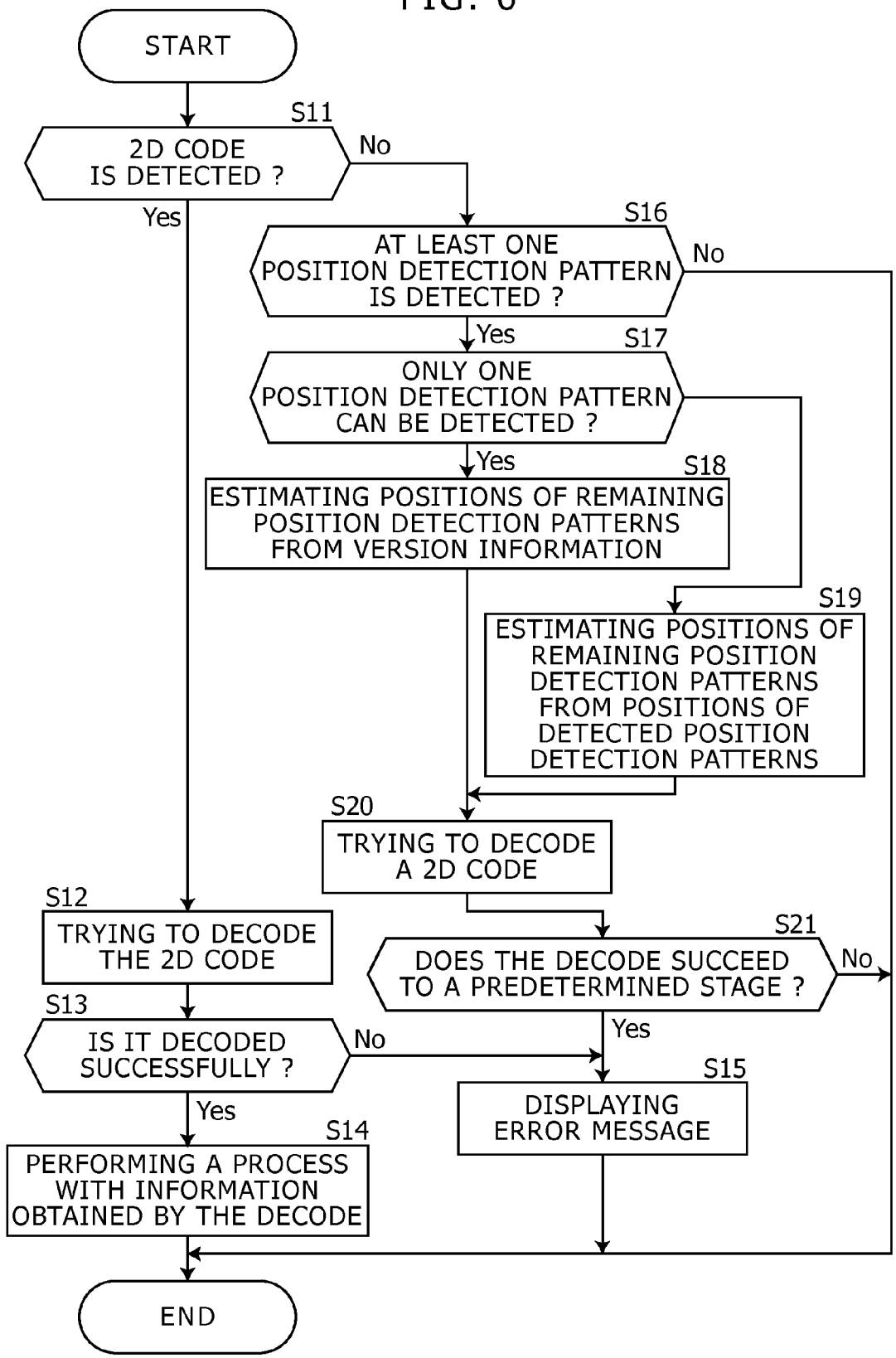
FIG. 6 shows a flowchart which explains a behavior of the image processing apparatus according to Embodiment 2.

In the following part, a behavior of the image processing apparatus in Embodiment 2 is explained. FIG. 6 shows a flowchart which explains a behavior of the image processing apparatus according to Embodiment 2.

As well as in Embodiment 1, in the image processing apparatus of Embodiment 2, if a 2D code is detected (Step S11), then decoding the 2D code is tried (Step S12). If the 2D code is decoded successfully (Step S13), then a predetermined process is performed (Step S14). If decoding the 2D code is failed (Step S13), then an error message is displayed (Step S15).

Contrary to this, in a case that a 2D code is not detected (Step S11), if at least one of the position detection patterns is detected (Step S16), then the broken matrix barcode detecting unit 21 estimates one or more positions of one or more remaining position detection patterns by performing a process corresponding to the number of the position detection pattern(s) detected by the 2D code detecting unit 11 (Steps S17, S18, and S19).

If only one of the position detection patterns is detected, then the broken matrix barcode detecting unit 21 causes the adjacent information searching unit 13 to search for version information adjacent to the detected position detection pattern. If the version information is found, then from the version information, the broken matrix barcode detecting unit 21 determines the numbers of cells in the vertical and the horizontal directions of this 2D code (i.e. a broken 2D code candidate), determines the cell size (e.g. number of pixels) of this 2D code, determines the size of this 2D code from the number of cells and the cell size, and estimates positions of the remaining position detection patterns from them (Step S18).

For example, if the orientation of the 2D code is fixed, then from a position of the detected position detection pattern in the 2D code, it is determined which of the position detection patterns 101b and 101c is the detected one. For example, from a relationship between a position of the detected position detection pattern and a position of the found version information, it may be determined which of the position detection patterns 101b and 101c is the detected one. If it is determined which of the position detection patterns 101b and 101c is the detected one, then it is possible to determine positions of the remaining position detection patterns from the detected position detection pattern.

If only two of the position detection patterns are detected, then the broken matrix barcode detecting unit 21 geometrically estimates a position of the remaining position detection pattern on the basis of positions of the detected two position detection patterns (Step S19).

Figure 7A:
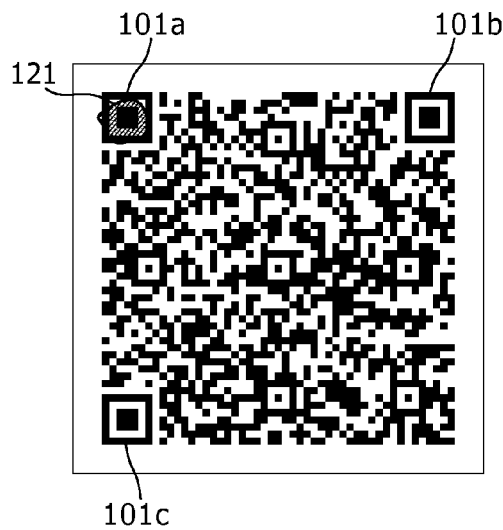
FIGS. 7A to 7C show diagrams which explain combinations of two position detection patterns if the only two position detection patterns are detected.
Figure 7B:
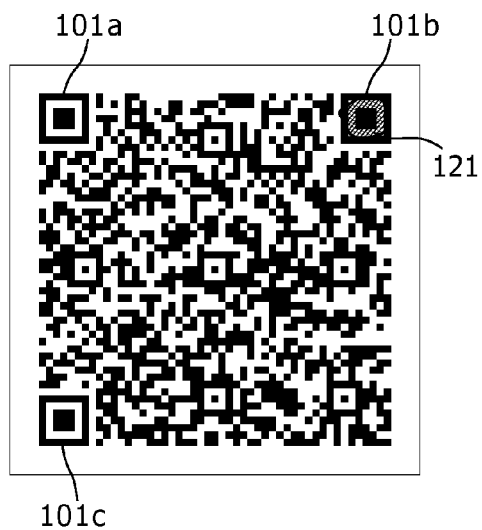
Figure 7C:
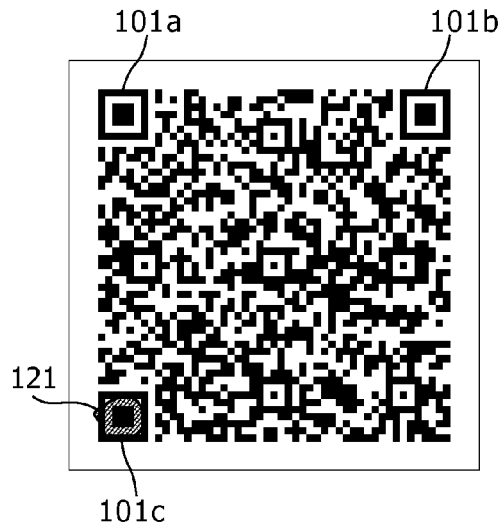

FIGS. 7A to 7C show diagrams which explain combinations of two position detection patterns if the only two position detection patterns are detected.

For example, if the orientation of the 2D code is fixed, then from positions of the detected position detection patterns in this 2D code (i.e. a broken 2D code candidate), it is determined which two of the position detection patterns 101a, 101b and 101c the detected two ones are.

In a case that a stain 121 covers the position detection pattern 101a as shown in FIG. 7A, the detected two position detection patterns are the position detection patterns 101b and 101c. In this case, the position of the position detection pattern 101a is estimated as a position (a) at 45 degrees from the direction from one to the other of the position detection patterns 101b and 101c, and (b) at a distance obtained by dividing the distance between the position detection patterns 101b and 101c by the square root of 2 (i.e. about 1.414).

In a case that a stain 121 covers the position detection pattern 101b as shown in FIG. 7B, the detected two position detection patterns are the position detection patterns 101a and 101c. In this case, the position of the position detection pattern 101b is estimated as a position (a) at 90 degrees from the direction from the position detection pattern 101a to the position detection pattern 101c and (b) at a distance from the position detection pattern 101a as same as the distance between the position detection patterns 101a and 101c.

In a case that a stain 121 covers the position detection pattern 101c as shown in FIG. 7C, the detected two position detection patterns are the position detection patterns 101a and 101b. In this case, the position of the position detection pattern 101c is estimated as a position (a) at 90 degrees from the direction from the position detection pattern 101a to the position detection pattern 101b and (b) at a distance from the position detection pattern 101a as same as the distance between the position detection patterns 101a and 101b.

For example, after detecting a finder pattern of QR code (trademark), it may be determined which of the position detection patterns 101a, 101b, and 101c is the detected one, from the given relationship between the position of the detected position detection pattern and the position of the detected finder pattern.

After estimating one or more positions of one or more undetected position detection patterns, the broken matrix barcode detecting unit 21 causes the 2D code decoding unit to try to decode a 2D code on the basis of the position(s) of both the detected position detection pattern(s) and the estimated position(s) of the remaining position detection pattern(s) (Step S20).

If the decode by the 2D code decoding unit 12 succeeds to a predetermined stage, then the broken matrix barcode detecting unit 21 determines that a broken 2D code exists in the image of the image data, and the display processing unit 15 causes the display device 4 to display an error message (Step S15).

On the other hand, the broken matrix barcode detecting unit 21 determines that a 2D code (including broken 2D code) does not exist in the image, if any of the position detection patterns is not detected (Step S16), if the decode does not succeed to the predetermined stage (Step S21) or if the version information is not obtained in Step S18.

In the aforementioned Embodiment 2, the broken matrix barcode detecting unit 21 determines whether a broken 2D code exists in the image or not when the 2D code detecting unit 11 does not detect a 2D code but detects at least one position detection pattern. The broken matrix barcode detecting unit 21 determines whether a broken 2D code exists in the image or not on the basis of a pattern in a predetermined position adjacent to the detected position detection pattern. Specifically, in Embodiment 2, the broken matrix barcode detecting unit 21 (a) estimates a position of a remaining position detection pattern on the basis of the version information if the version information is detected by the adjacent information searching unit 13, (b) causes the 2D decoding unit 12 to try to decode a 2D code on the basis of the positions of both the detected position detection pattern and the remaining position detection pattern, and (c) determines that a broken 2D code exists in the image if the decode succeeds to a predetermined stage.

Therefore, it is possible to detect existence of a broken 2D code which is not detected as a 2D code, and to lessen troubles involved due to breakage of a 2D code.

The description of the present invention has been presented for purposes of illustration and description, and is not intended to be exhaustive or limited to the invention in the form disclosed.

Figure 8:
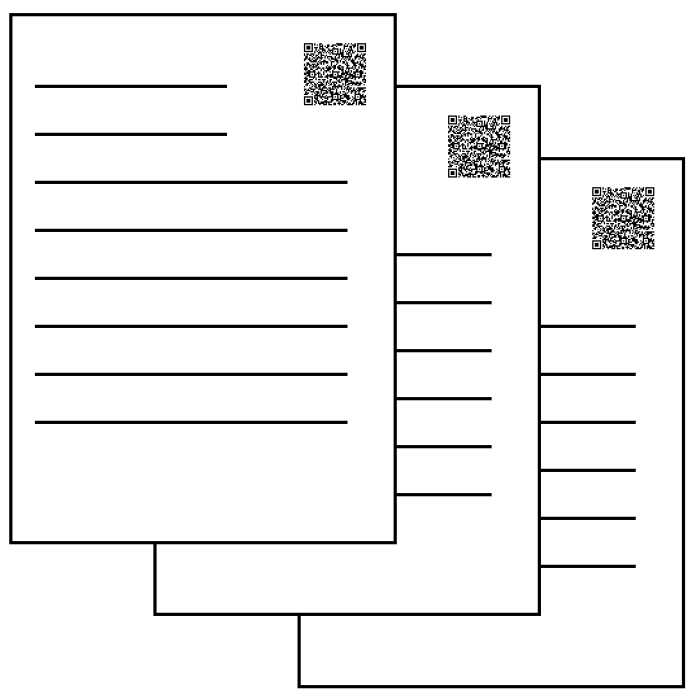
FIG. 8 shows a diagram which indicates an example of documents on which 2D codes are printed.

For example, the image processing apparatus of any of the aforementioned embodiments may be applied to an image forming apparatus performing facsimile transmission and/or Internet facsimile transmission, which (a) scans document images as shown in FIG. 8 by the image scanning device 1, (b) obtains address information by decoding 2D codes in the respective document images, and (c) transmits the document images to respective addresses specified in the address information by the communicating device 3. In this case, if a broken 2D code is detected in one of the document images, then an error message is displayed and image data of the document image which includes the broken 2D code is not transmitted.

It should be understood that various changes and modifications to the embodiments described herein will be apparent to those skilled in the art. Such changes and modifications may be made without departing from the spirit and scope of the present subject matter and without diminishing its intended advantages. It is therefore intended that such changes and modifications be covered by the appended claims.

What is claimed is:

1. An image processing apparatus, comprising:
   a two-dimensional matrix barcode detecting unit configured to detect a two-dimensional matrix barcode if an image of image data includes the two-dimensional matrix barcode;
   a broken matrix barcode detecting unit configured to determine whether a broken two-dimensional matrix barcode exists in the image or not when the two-dimensional matrix barcode detecting unit does not detect the two-dimensional matrix barcode but detects at least one position detection pattern, wherein the broken matrix barcode detecting unit is further configured to determine whether the broken two-dimensional matrix barcode exists in the image or not on the basis of a pattern in a predetermined position adjacent to the detected position detection pattern;
   an adjacent information searching unit configured to search for version information in the predetermined position; and
   a two-dimensional matrix barcode decoding unit configured to decode a two-dimensional matrix barcode;
   wherein the broken matrix barcode detecting unit is further configured (a) to estimate a position of a remaining position detection pattern on the basis of the version information if the version information is detected by the adjacent information searching unit, (b) to cause the two-dimensional matrix barcode decoding unit to try to decode a two-dimensional matrix barcode on the basis of the positions of the detected position detection pattern and the remaining position detection pattern, and (c) to determine that the broken matrix barcode exists in the image if the decode succeeds to a predetermined stage.

2. The image processing apparatus according to claim 1, wherein:
   the broken matrix barcode detecting unit is further configured to estimate the position of the remaining position detection pattern on the basis of the number of cells determined from the version information and a cell size.

3. An image processing apparatus, comprising:
   a two-dimensional matrix barcode detecting unit configured to detect a two-dimensional matrix barcode if an image of image data includes the two-dimensional matrix barcode;
   a broken matrix barcode detecting unit configured to determine whether a broken two-dimensional matrix barcode exists in the image or not when the two-dimensional matrix barcode detecting unit does not detect the two-dimensional matrix barcode but detects at least one position detection pattern, wherein the broken matrix barcode detecting unit is further configured to determine whether the broken two-dimensional matrix barcode exists in the image or not on the basis of a pattern in a predetermined position adjacent to the detected position detection pattern; and
   a two-dimensional matrix barcode decoding unit configured to decode a two-dimensional matrix barcode;
   wherein the broken matrix barcode detecting unit is further configured (a) to estimate a position of the remaining position detection pattern on the basis of positions of the detected position detection patterns, (b) to cause the two-dimensional matrix barcode decoding unit to try to decode a two-dimensional matrix barcode on the basis of the positions of the detected position detection patterns and the remaining position detection pattern, and (c) to determine that the broken matrix barcode exists in the image if the decode succeeds to a predetermined stage, if two position detection patterns are detected in the image.

4. The image processing apparatus according to claim 3, further comprising:

an adjacent information searching unit configured to search for version information in the predetermined position;

wherein the broken matrix barcode detecting unit is further configured (a) to estimate positions of two remaining position detection patterns on the basis of the version information if the version information is detected by the adjacent information searching unit, (b) to cause the two-dimensional matrix barcode decoding unit to try to decode a two-dimensional matrix barcode on the basis of the positions of the detected position detection pattern and the remaining position detection patterns, and (c) to determine that the broken matrix barcode exists in the image if the decode succeeds to a predetermined stage, if one position detection pattern is detected in the image.

5. An image processing apparatus, comprising:

an image scanning device configured to scan document images;

a two-dimensional matrix barcode detecting unit configured to detect a two-dimensional matrix barcode if one of the document images includes the two-dimensional matrix barcode;

a broken matrix barcode detecting unit configured to determine whether a broken two-dimensional matrix barcode exists in the document images or not when the two-dimensional matrix barcode detecting unit does not detect a two-dimensional matrix barcode but detects at least one position detection pattern, the broken matrix barcode detecting unit further configured to determine whether the broken two-dimensional matrix barcode exists in the document images or not on the basis of a pattern in a predetermined position adjacent to the detected position detection pattern;

a two-dimensional matrix barcode decoding unit configured to decode the two-dimensional matrix barcode detected by the two-dimensional matrix barcode detecting unit to obtain an address of the one of the document images; and a communicating device configured to transmit the one of the document image to the address if the two-dimensional matrix barcode detecting unit detects the two-dimensional matrix barcode, and not to transmit the one of the document image if the broken matrix barcode detecting unit detects the broken two-dimensional matrix barcode in the one of the document image.

* * * * *